US012792746B2

(12) United States Patent
Pospieszalski

(10) Patent No.: US 12,792,746 B2
(45) Date of Patent: Nov. 10, 2026

(54) SECURE CRYPTOGRAPHIC SERVER CARD

(71) Applicant: MatterFi, Sheridan, WY (US)

(72) Inventor: Michal Pospieszalski, West Hollywood, CA (US)

(73) Assignee: MatterFi, Sheridan, WY (US)

( * ) Notice: Subject to any disclaimer, the term of this patent is extended or adjusted under 35 U.S.C. 154(b) by 929 days.

(21) Appl. No.: 17/732,511

(22) Filed: Apr. 28, 2022

(65) Prior Publication Data

US 2022/0374529 A1 Nov. 24, 2022

Related U.S. Application Data

(60) Provisional application No. 63/181,221, filed on Apr. 28, 2021.

(51) Int. Cl.
*G06F 21/60* (2013.01)
*G06F 21/64* (2013.01)

(52) U.S. Cl.
CPC ............ *G06F 21/602* (2013.01); *G06F 21/64* (2013.01)

(58) Field of Classification Search
CPC ......... G06F 21/602; G06F 21/64; G06F 21/74
See application file for complete search history.

(56) References Cited

U.S. PATENT DOCUMENTS

| | | | | |
|---|---|---|---|---|
| 10,802,488 | B1 * | 10/2020 | Abeloe | G06N 3/084 |
| 2004/0201751 | A1 * | 10/2004 | Bell | H04N 5/772 386/E5.072 |
| 2018/0217828 | A1 * | 8/2018 | Madrid | H04L 9/3247 |
| 2020/0134206 | A1 * | 4/2020 | Thekadath | G06F 21/602 |
| 2020/0210402 | A1 * | 7/2020 | Hu | G06Q 20/401 |
| 2021/0097528 | A1 * | 4/2021 | Wang | H04L 9/30 |
| 2022/0329437 | A1 * | 10/2022 | Burk | G06F 21/78 |
| 2023/0010440 | A1 * | 1/2023 | Tait | H04W 12/06 |

* cited by examiner

*Primary Examiner* — Thaddeus J Plecha
(74) *Attorney, Agent, or Firm* — Richard G. Topolewski

(57) ABSTRACT

A crypto expansion card including a computer interface, a secure computing enclave having a secure microcontroller unit running smart contracts. The computer interface can couple the computer expansion card to a computing device. The secure computing enclave may be coupled to the computer interface. The secure computing enclave includes a secured micro controller unit configured to run smart contacts by: receiving a cryptographic request via the computer interface, verifying the cryptographic request is properly signed and processing the verified cryptographic request. The processing of the verified cryptographic request includes using a private cryptographic security key. The processing of the verified cryptographic request on the secure micro controller unit may include using the private cryptographic security key to generate a cryptographic signature that may be part of a multi signature address. The crypto expansion card where the micro controller unit configuration is unalterable or is updatable with a cryptographically signed update.

11 Claims, 5 Drawing Sheets

SECURE CRYPTOGRAPHIC SERVER CARD

CROSS-REFERENCE

This application claims the benefit of U.S. Provisional Application No. 63/181,221 titled "SECURE CRYPTOGRAPHIC SERVER CARD," filed Apr. 28, 2021.

BACKGROUND

Technical Field

The present disclosure relates to cryptocurrency and, more specifically, to server security including physical hardware for protection of signing keys for cryptocurrency transactions.

Background Information

Blockchain users will deposit funds with 3rd-party custodians such as exchanges for the increased functionality available there, like trading on markets. These 3rd-party custodians are historically where most theft and fraud have occurred, and the losses are in the billions.

Unfortunately, servers in use today must be trusted to hold the funds, to accurately maintain their internal ledger, and to faithfully execute the transactions requested by their users.

Currency exchanges and other trading platforms usually desire to perform order matching more rapidly than what is possible on the blockchain itself. These services accept custody of user funds, perform transactions in a separate off-chain system, and use a database to track customer balances. Typically, these services are not cryptographically secured, or independently auditable. Customers also give full control of their deposited funds to the custodial service, which exposes them to the risk of theft or loss of their coins.

Unlike legacy currencies, cryptocurrencies can be irrevocably lost or stolen, and it's typically not possible to distinguish between insider or external theft. Historically, this ambiguity appears to have been routinely exploited.

Unlike legacy currencies, cryptocurrencies lend themselves to allowing each bitcoin transaction (even off-blockchain transactions) to be cryptographically secured. Cryptographically secured processing that provides cryptographically assured audit trails have been developed, for example, the Open Transactions (OT) protocol.

What is needed is a more secure approach to the hardware and software processing of sensitive cryptocurrency security functions (for example financial transactions) that increases the security of any server operating crypto currency transactions, but without much or any changes to the end user experience or slowdown in processing.

SUMMARY OF THE INVENTION

A crypto expansion card including a computer interface, a secure computing enclave having a secure microcontroller unit running smart contracts. The computer interface can couple the computer expansion card to a computing device. The secure computing enclave may be coupled to the computer interface. The secure computing enclave includes a secured micro controller unit configured to run smart contacts by: receiving a cryptographic request via the computer interface, verifying the cryptographic request is properly signed and processing the verified cryptographic request.

The processing of the verified cryptographic request includes using a private cryptographic security key.

The processing of the verified cryptographic request on the secure micro controller unit may include using the private cryptographic security key to generate a cryptographic signature that may be part of a multi signature address. The crypto expansion card where the micro controller unit configuration is unalterable or is updatable with a cryptographically signed update.

The private cryptographic security key may be accessed via the auxiliary data connector or from secured memory in the crypto expansion card.

The crypto expansion card where the secure computing enclave is on a single integrated circuit chip.

The crypto expansion card where the cryptographic request is to transfer a crypto asset that may involve on-blockchain address or off-blockchain account. The crypto expansion card where the cryptographic request to transfer the crypto asset includes an Open Transactions protocol transaction.

A crypto transaction processing system including two or more physical computers where each of the physical computers has a computer expansion card and each computer expansion card generates a signature with a private key for the same multi signature blockchain address.

BRIEF DESCRIPTION OF THE DRAWINGS

Reference numerals may be repeated among the figures to indicate corresponding or analogous elements. The figures are listed below.

DETAILED DESCRIPTION

Numerous specific details are set forth in order to aid in developing a thorough understanding, however, it will be understood that in practice, the functionality or capability may be practiced without the specific details presented. In other instances, well-known methods, procedures, components, units, and circuits are not described in detail so as not to obscure the discussion.

Figure 1:
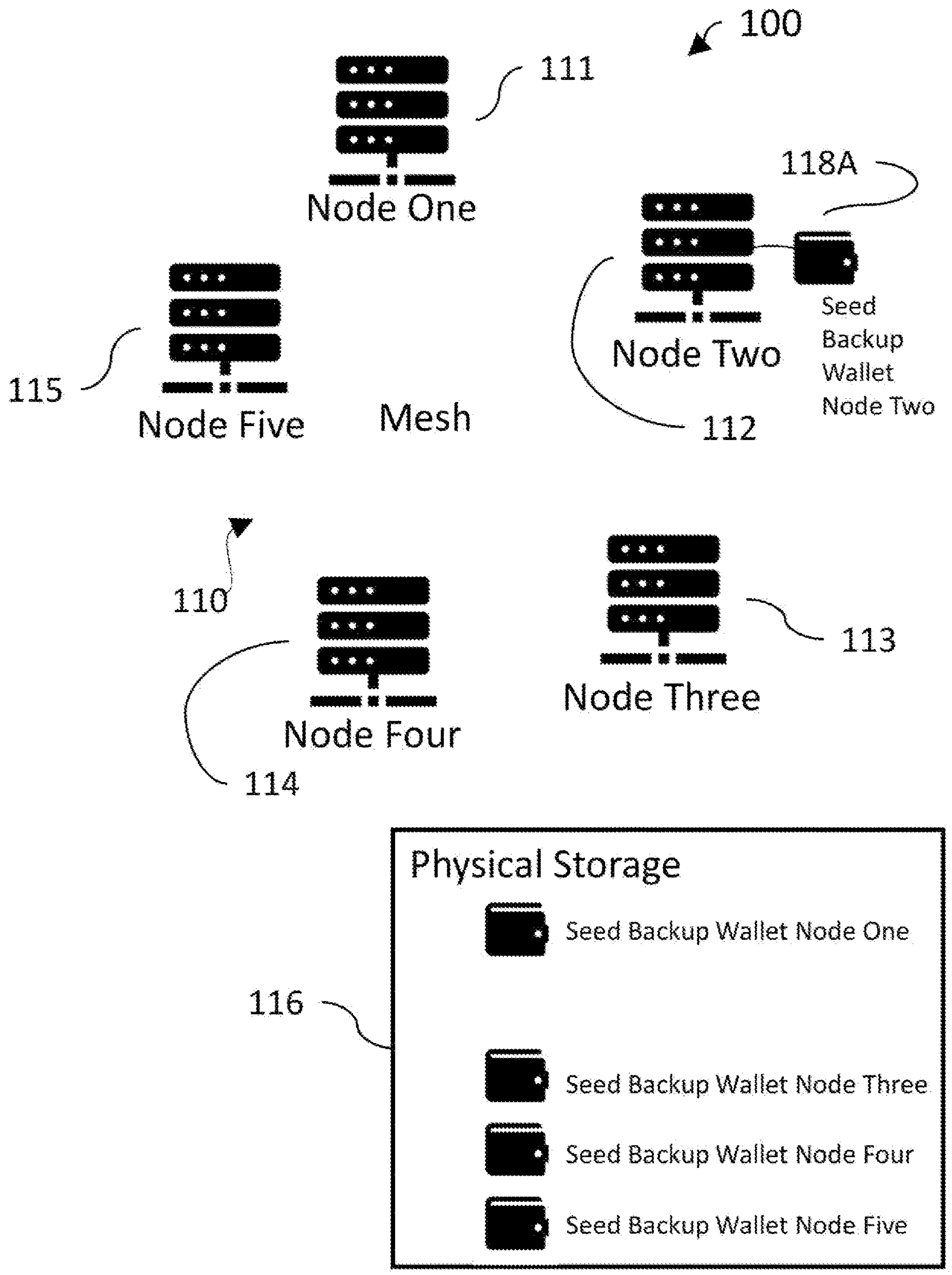
FIG. 1 is an illustration of a crypto transaction processing system with a network of servers.

FIG. 1, illustrates a block diagram of a crypto transaction processing system 100 that may be used for managing secured cryptocurrency transactions.

The crypto transaction processing system 100, is shown with a mesh network 10 that may include a plurality of nodes 111, 112, 113, 114 and 115 (for example, node one 111, node two 112, node three 113, node four 114 and node five 115), and a physical storage area 116 for seed backup wallets, and shows the seed backup wallet 118A for node two attached to node two 112. Each node may include a notary server. Each node may include an audit server. The crypto transaction processing system 100 may include a voting pool that includes a set of audit servers.

The notary servers may receive signed transactions, note their arrival, and do other bookkeeping tasks, including requesting that the audit servers execute an on-blockchain transaction.

The node-communication between the nodes 111, 112, 113, 114 and 115 may be done by any number of communication protocols, for example, the Open Transactions messaging protocol. The node-communication from the notary servers to the audit servers may use a broadcast protocol so all the notaries can broadcast messages and all the audit servers can receive messages from the notaries. The node-communication may have be decentralized, encrypted, peer-to-peer, trustless communications protocol that can be used to send encrypted messages to multiple subscribers. The node-communication may be done using a broadcast on a particular communication channel. The node-communication may use a protocol like Bitmessage. The identity of the communication channel may use a hash of a smart contract (for example the hash of the voting pool smart contract), or a smart property of the smart contract. The smart property may be used as the broadcast address. See U.S. Provisional Application No. 63/140,270 for a description of how a voting pool may be implemented. The U. S. Provisional Application No. 63/140,270, (filed Jan. 22, 2020), is incorporated by reference for all purposes as if fully written in this document.

When a notary server receives a properly signed transaction the notary server may process the requests for on-blockchain transactions using a blockchain address. In order to execute the on-blockchain transaction the blockchain address may require multiple approval signatures, signed by different private keys (i.e., a multisig, multiple signature blockchain address).

On-blockchain may refer to distributed ledger technology using blockchain or other distributed ledger technologies for example Directed Acyclic Graph (DAG).

An individual server lacks the ability to move crypto assets on a multi-signature address on its own in a voting pool when a multi-signature vote is necessary to move crypto assets on that blockchain address, thus a server is incapable of stealing crypto assets from a voting pool. In addition, since the notary servers fails to have the private keys and the votes are under the control of the audit servers, notary servers are incapable of malicious action.

Since the audit servers with their private keys authorize the creation of a blockchain transaction on a multi-signature address during the processing of a signed request, the audit servers must act by consensus and with their individual audit server private keys to sending on the blockchain a signature authorizing the transaction. Once the blockchain receives enough signatures for multi-signature blockchain address the then transaction will be authorized. One way for a bad actor to attempt to steal funds and break the crypto transaction processing system 100 would be by stealing a super majority of the private keys from the audit servers. Thus, it is desirable to prevent bad actors from accessing the private keys of any audit server, and this may be accomplished by adding more barriers for an attacker to overcome.

To have an easy-to-implement, secure, server-based, financial crypto-system a crypto expansion card may store crypto currency private keys and have the cryptographic security functionality and processes implemented in the convenient functioning single-expansion-card that can integrate with an off-the-shelf computers, like a server, via a computer interface.

A voting pool is an arrangement of notary servers and audit servers to securely store and account for customer crypto assets (e.g., crypto currency) deposits and to process valid withdrawal requests. A notary may be an individual or organization that is running a node on the network 10, where the node may have a notary server and audit server. Voting pools are designed to ensure that no single person or organization can perform a unilateral action on deposited crypto assets, this is to reduce the risk of loss or theft and thus reduced custodial liability.

Each notary in the voting pool may operate an audit server, and each audit server may have a corresponding blockchain private key server wallet. The server wallet, it a crypto wallet and may generate a signature needed for authorizing the generation of a multi-signature transaction. The server wallet may have a hierarchical and deterministic list of addresses for a blockchain like the bitcoin blockchain or colored coins.

When a customer deposits crypto assets (e.g. cryptocurrency) into a voting pool, in return, the customer receives corresponding units of crypto assets in an account on a notary server of their choice. Each audit server may watch the receipt stream for requests to deposit or withdraw crypto assets (like crypto currency, for example bitcoins or colored coins) from the voting pool and then communicate with its blockchain wallet as appropriate.

An audit server independently verifies the operations of all notaries in the voting pool and the crypto assets held by the voting pool on the blockchain itself. The audit server uses this audit data to know when it should direct the wallet to authorize the creation of a withdrawal transaction. The audit server is also responsible for information sharing and achieving consensus between members of the voting pool. The effect of these behaviors is that each audit server conducts a permanent, real-time proof-of-reserves audit against all of the notary servers in the voting pool and simultaneously enforces it. The audit server wallets hold the private keys for creating blockchain transactions at the request of the user when a proper cryptographically signed request is received. The audit servers act by consensus using the private keys in their wallet to send a signed request to create multi-signature blockchain transactions.

Each voting pool, regardless of how many servers, aka notary servers it contains, may be implemented as a single node with its own BIP-47 identity that supports on-chain multi-signature (multisig).

In the case of a crypto transaction processing system 100 with a voting pool, for example an audit server voting pool, in order for the bad actor to compromise the crypto transaction processing system 100, the bad actor would need physical access to the voting majority of audit servers at minimum. Being that the audit servers can be located in different locations, these requirements provide a much higher barrier, thus significantly increasing the security of the system. But even physical access to the server is not likely to be enough because if reading the key from the crypto expansion card is not enabled, then the bad actor would need to break the additional security that may protect the private key stored in the crypto expansion cards.

To help secure any private keys in a crypto system the servers that do cryptographic operations (for example signing) may use a crypto expansion card to provide increase security with minimal decrease in throughput, or no decrease in throughput, or even with an increase in throughput. Example of such servers may include notary server, off-chain server, or any server that does cryptographic operations with private keys.

The crypto expansion card may provide security-critical functionality that may be implemented with all the hardware and software processing security-sensitive functionality inside the single Integrated Circuit die, a microscopic environment that significantly raises the difficulty in extracting the private cryptographic key. Storing private cryptographic keys on a crypto expansion card provides an easy way to add cryptographic security transactions to a standard computer server.

Figure 2:
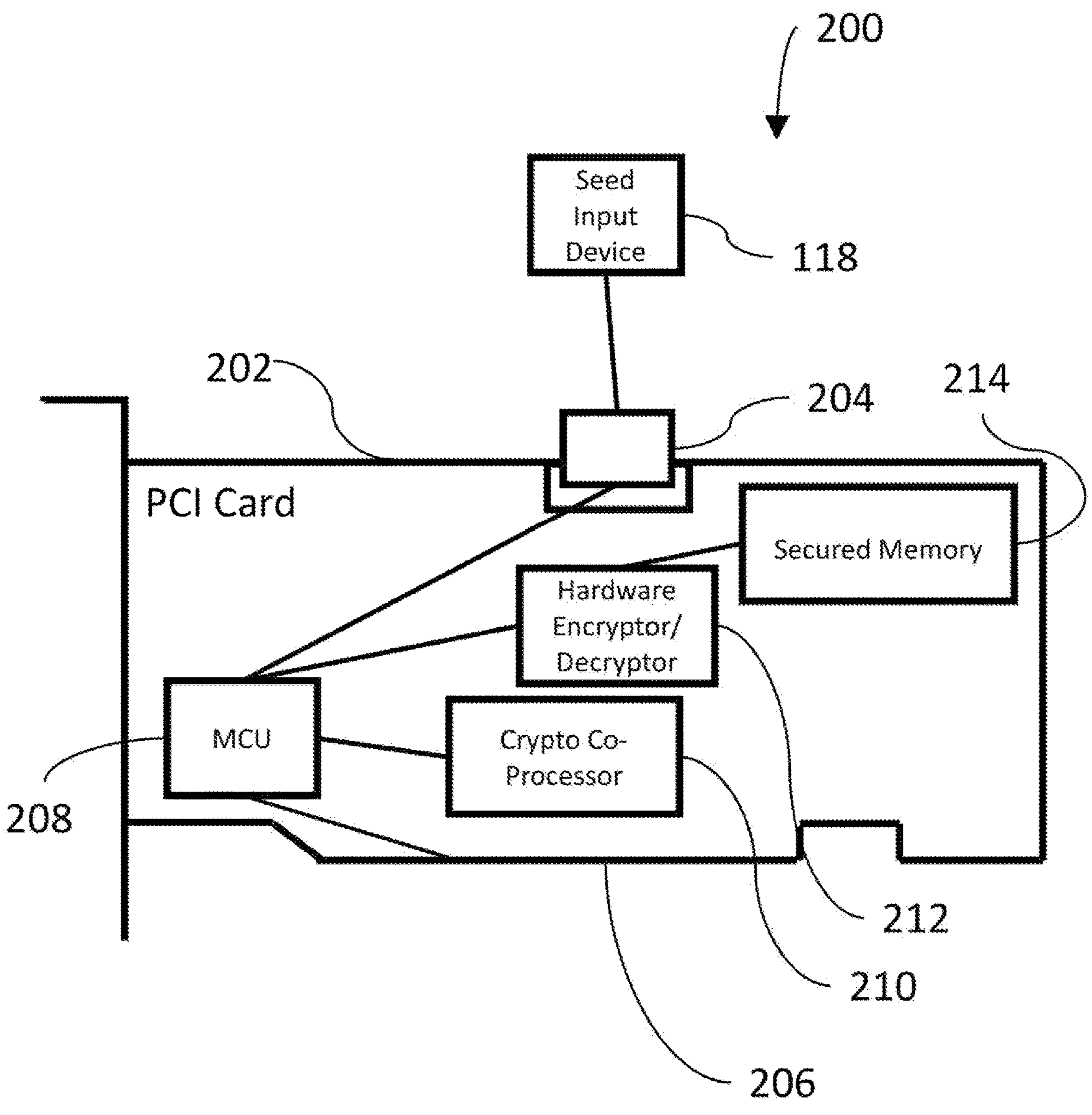
FIG. 2 is an illustration of a block diagram of a crypto expansion card with a seed input device.

FIG. 2, illustrates a block diagram 200 of a crypto expansion card 202 for a computing device like a computer server with a seed input device 118 attached to the crypto expansion card 202.

The seed input device 118 may have a private cryptographic security key, that it may provide to the crypto expansion card 202. The seed input device 118 may require the crypto expansion card 202 to prove it is a trusted environment before providing access to the private key, for example, providing proof it is signed by a trusted private key known to the seed input device 118.

The seed input device 118 may be software upgradable so long as that software upgrade process is tamper-proof and cryptographically secure, for example cryptographically signed by a trusted private key. The seed input device 118 may be implemented by hardware or by software or by a combination of hardware and software.

The seed input device 105 may have input devices such as a keyboard or a touchpad.

The seed input device 105 may use a deterministic key generation algorithm that relies on an easily human referenced id such as the "mnemonic code words" as specified in BIP-39.

FIG. 2 illustrates the crypto expansion card 202 with an auxiliary data connector 204, a computer interface 206, a secure micro controller unit 2068, a crypto co-processor 210, a hardware encryptor/decryptor 212, and a secure memory 214.

The crypto expansion card 202 may employ a secure computing enclave architecture. The secure micro controller unit 2068, crypto co-processor 210, hardware encryptor/decryptor 212, and the secure memory 214 may be part of the secure computer enclave architecture. The secure computing enclave may be coupled to the computer interface 206.

The secure micro controller unit 2068 may implement in a secure enclave the crypto co-processor 210 and hardware encryptor/decryptor 212.

The crypto expansion card 202 may include a single IC (Integrated Circuit) die implementation that may include the secure micro controller unit 2068, a crypto co-processor 210, secure memory 214, and a hardware encryptor/decryptor 212.

See U.S. Provisional Application No. 63/125,947 for a description of how security can be implemented on the crypto expansion card 202. The. U.S. Provisional Application No. 63/125,947, (filed Dec. 15, 2020), is incorporated by reference for all purposes as if fully written in this document.

The crypto expansion card 202 shows the computer interface 206 as a Peripheral Component Interconnect PCI card but other interfaces may be use, such as, USB, PCMICA or other industry standards or other proprietary interfaces. The computer interface 206 may couple the crypto expansion card 202 to a computing device. If the computer interface 206 implements an industry standard interface, then the computer can gain the described capability without any changes to the end-user experience and little or no slowdown in processing throughput.

The auxiliary data connector 204 may be a USB connector, serial (e.g., RS-232) or short-range wireless like Bluetooth, or other industry standard or customized data connection that either provides secured or unsecured communication.

The auxiliary data connector 204 may provide access to the private cryptographic security key, for example when needed for processing a request, or to copy it to the secure memory 214.

Since the auxiliary data connector 204 may be the only way to get the private cryptographic key loaded on the crypto expansion card, and maybe the only way to get the cryptographic key from the crypto expansion card 202, for a bad actor to compromise a server they would need physical access to the server. Network access to a computer housing the crypto expansion card 202 should provide no possibility of access to the private security key.

Data from the auxiliary data connector 204 may be considered trustworthy by the crypto expansion card 202, particularly the secure micro controller unit 2068 and the crypto co-processor 210. The crypto expansion card 202 may consider all input from the auxiliary data connector 204 as trustworthy if the only way to connect via to auxiliary data connector 204 is via physical access to the auxiliary data connector 204. The crypto expansion card 202 may consider all input from the auxiliary data connector 204 as untrustworthy and require additional security such as a code (e.g., a 4-digit code), a password or some other form of authentication. The crypto expansion card 202 may consider all input from the auxiliary data connector 204 as untrustworthy if the auxiliary data connector 204 is wireless.

The secure micro controller unit 2068 may be connected to a computer via the computer interface 206. The secure micro controller unit 2068 may run smart contacts. The secure micro controller unit 2068 may be unalterable, meaning the programs that that the secure micro controller unit 2068 runs cannot be changed or updated. For example, a single burn PROM or ROM or other technology that is not physically updatable or could be restricted to only be updated by cryptographically proven (e.g., a software update private key signed) software content updates. The public key corresponding the software update private key may be stored in the secure memory 214.

The secure micro controller unit 2068 may be software upgradable so long as that software upgrade process is tamper-proof and cryptographically secure, for example cryptographically signed by a trusted private key. The functionality of the secure micro controller unit 2068 may be implemented by hardware or by software or by any combination of hardware and software.

The crypto co-processor 210 implements crypto functions. The crypto functions maybe ones that are well established or are not expected to change significantly over time. The crypto co-processor 210 can speed up the processing of crypto transactions.

The hardware encryptor/decryptor 212 may use an internal secret symmetric key pair. The secret symmetric key pair may be generated from hardware-derived entropy. The hardware-derived entropy may come from a micro radiation source. The secret symmetric key may be uniquely set at time of manufacture.

The hardware encryptor/decryptor 212 may destroy the symmetric or other cryptographic key used in decrypting the secure memory 214, if the crypto expansion card 202 is broken or tampered with.

The secure memory 214 may store a copy of a secure cryptographic private key received from a seed input device 118 connected to the auxiliary data connector 204.

The secure memory 214 may not be addressable from the computer interface 206, i.e., the crypto expansion card 202 restricts direct access to the data in the secure memory 214. The restriction may be because of software, firmware or hardware limitations.

The secure memory 214 may store the private cryptographic security key after encrypting by the hardware encryptor/decryptor 212. The secured memory 214 may be distinguished from plain memory in that the data stored in the memory is encrypted, for example by the encryptor/decryptor 212.

The secure memory 214 and the secure micro controller unit 2068 may be on a single integrated circuit.

The information stored in the secure memory 214 may be stored in an encrypted format because of it going through the encryptor/decryptor 212 which may be hardware circuitry. The encryptor/decryptor 212 may be software that encrypts the information before it is written into the secure memory 214. The hardware encryptor/decryptor 212 may be difficult/impossible to tamper with, for example there is no exposed electrical connections that talk directly to the encryptor/decryptor 212, as may be achieved by fabricating the crypto co-processor 210 and the encryptor/decryptor 212 in a single die IC (Integrated Circuit).

The data stored in the secure memory 214 may be securely protected first because the data may be encrypted at rest in the secure memory 214, and second, the only way to unencrypt it is to use the hardware encryptor/decryptor 212 that works as part of a program (i.e. a smart contract) while the hardware symmetric keys are still intact in the hardware encryptor/decryptor 212.

Figure 3A:
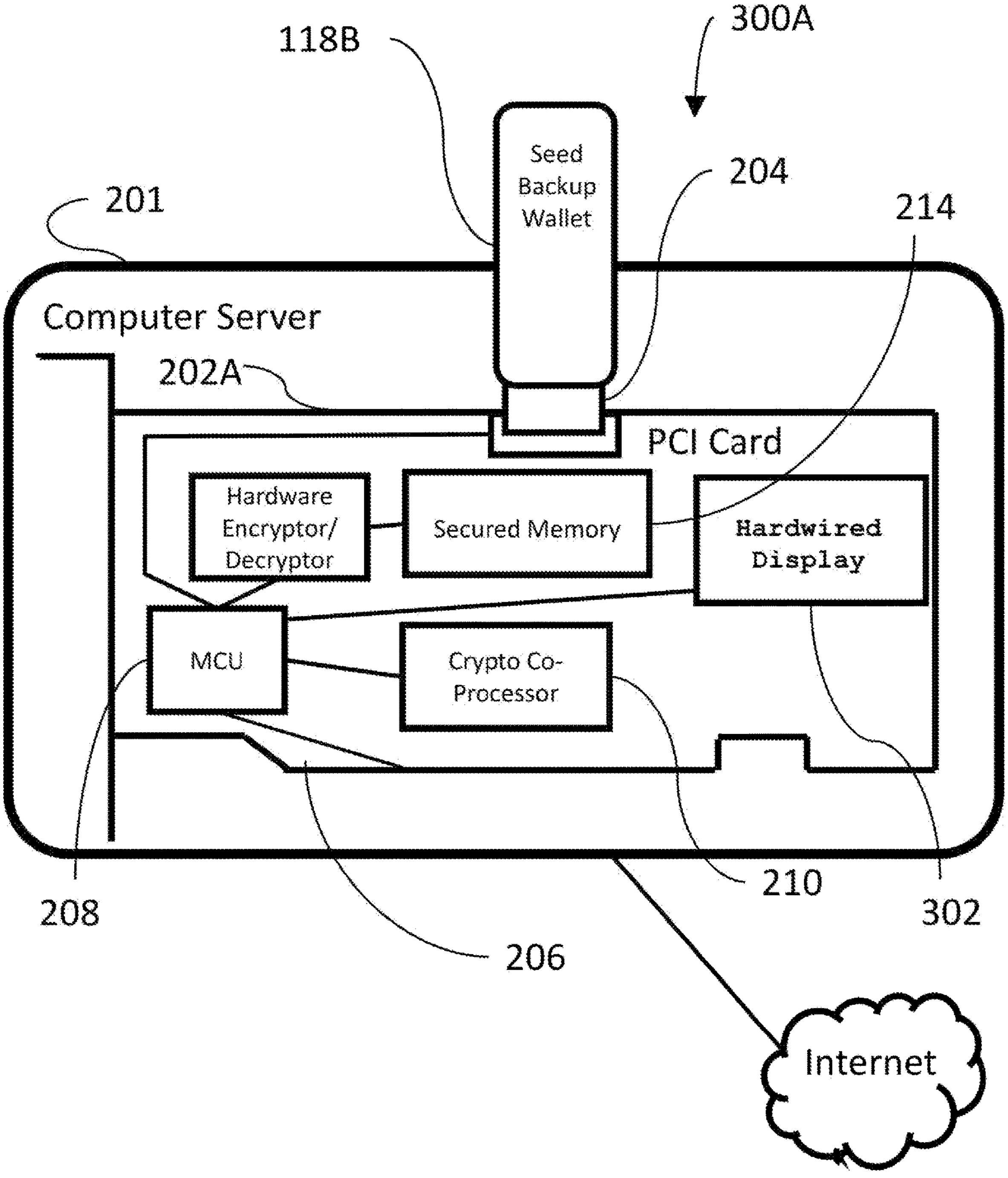
FIG. 3A is an illustration of the seed input device as a seed backup wallet connected to the crypto expansion card in a server computer.

FIG. 3A illustrates a block diagram 300A that shows a crypto expansion card 202A in a computing device a server computer 2061 with a hardwired display 202 and the seed input device 118 that is a seed backup wallet 118B depicted as a USB stick. The crypto expansion card 202A shows the computer interface 206 coupling the crypto expansion card 202A to the server computer 2061.

The crypto expansion card 202A shows a hardwired display 202. The hardwired display may be just a simple light, e.g., LED, that turns green when the secret key has been successfully updated. The hardwired display 204 may be, for example, a simple LCD display capable of black/white blocks, or alphanumeric characters.

Figure 3B:
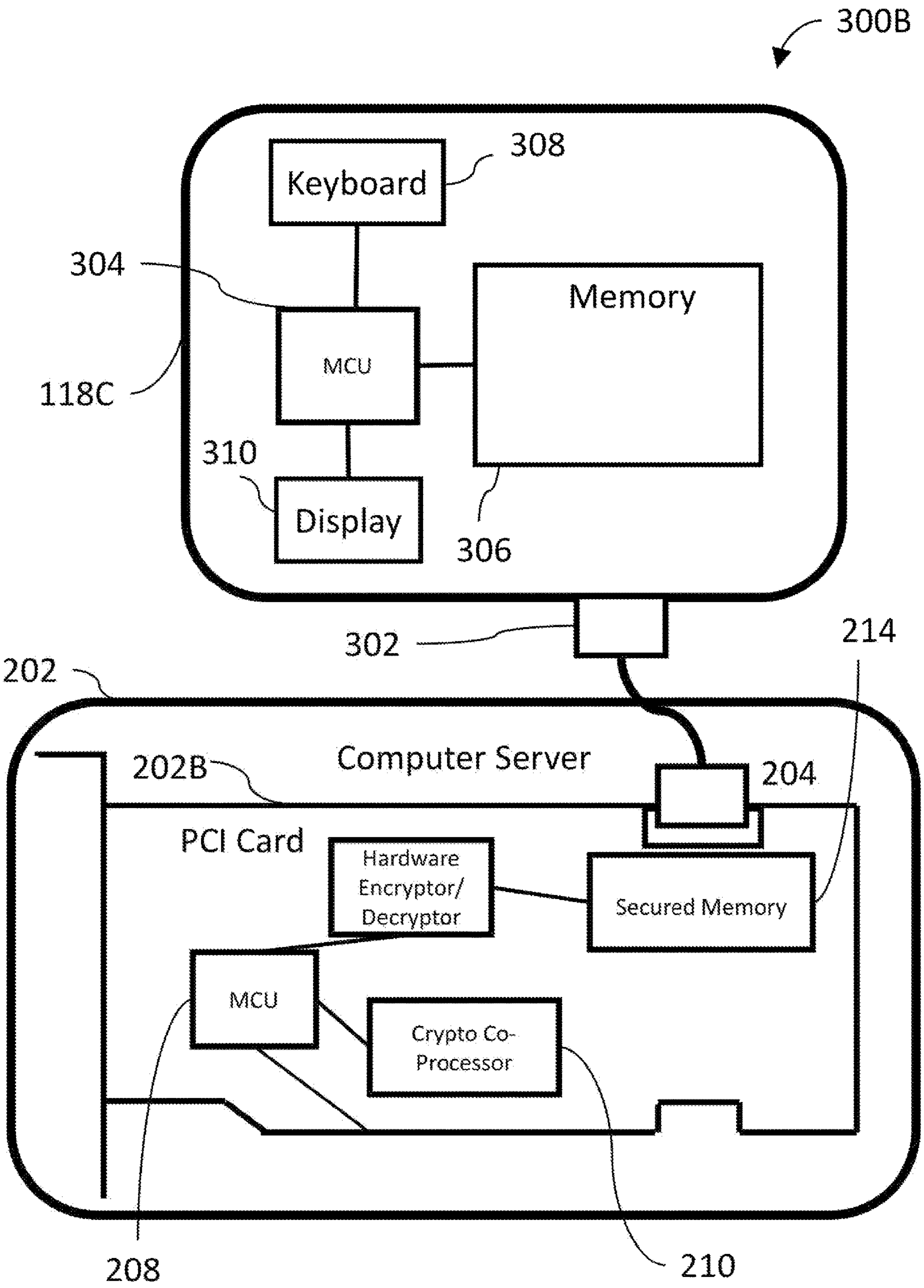
FIG. 3B is an illustration of a seed entry device connected to the crypto expansion card in a server computer.

FIG. 3B illustrates a block diagram 300B that shows a crypto expansion card 202B, installed in a server computer 2061, and attached to a seed input device 118 shown as a wired seed input device 118C attached to the crypto expansion card 202B via the auxiliary data connector 204.

The seed input device 118C may include a Universal Serial Bus (USB) interface 302, a processor 304, a memory 306, a keyboard 308, and a display 310.

The USB interface 302 may be configured to transfer the secured private key to the secured memory 214.

The keyboard 308 may be used to initiate an input of a private key, either by direct input or restoration using twelve-word backup phrase. Display 310 may provide instruction for the user on how to perform data input and provide feedback on input provided. The keyboard 308 and the display 310 may be embedded in a touchscreen.

The seed input device 118C may be a smartphone, and a short-range wireless interface may replace the USB interface. Wired or physical connection may be preferred so that complete physical access is required.

Figure 4:
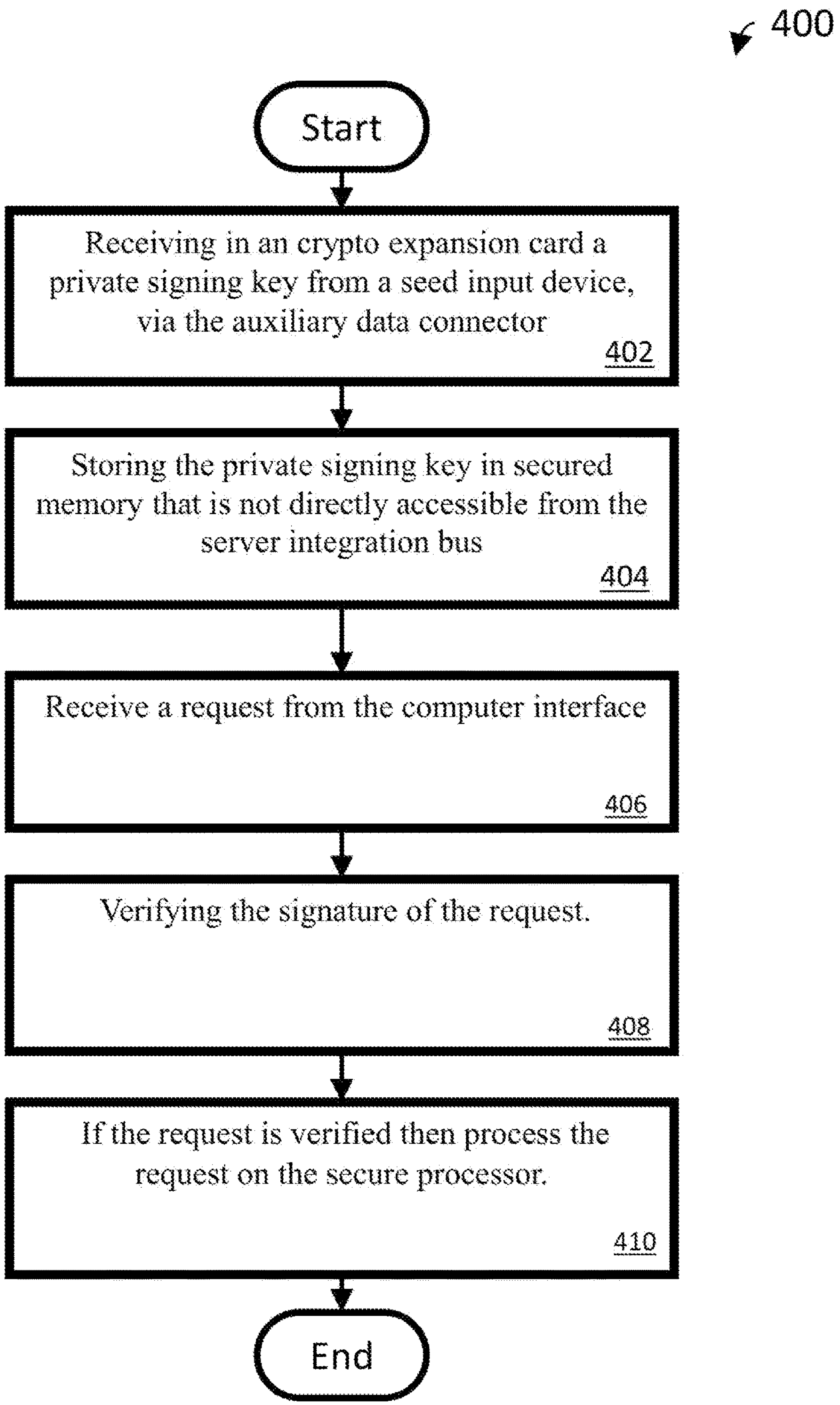
FIG. 4 illustrates a flow chart of a method of a secured transaction between the crypto expansion card and a server computer.

FIG. 4 illustrates a flow chart 400 showing an implementation of a process of using the crypto expansion card 202.

The flow chart 400 starts at box 402 where the crypto expansion card 202 receives a private signing key from a seed input device 118, via the auxiliary data connector 204.

Next the flow chart 400 continues at box 404 where the secure micro controller unit 2068 stores the private signing key in the secured memory 214.

Next the flow chart 400 continues at box 406 where a request is receive from the computer interface 206.

The crypto expansion card 202 via the secure micro controller unit 2068, the crypto co-processor 210, the secure memory 214, and the hardware encryptor/decryptor 212 may support processing of requests. The requests may be for transactions. The transactions may be standard protocol transactions, for example Bakes and Open Transactions protocol standard transactions.

The programs (i.e. smart contracts) on the secure micro controller unit 2068 may be run by receiving a cryptographic request via the computer interface 206.

Next the process continues at box 408 where the request is verified. The request may be verified by ensuring the cryptographic request is signed by a specific cryptographic key (for example the customer private key that corresponds to an off-blockchain customer account, that has the corresponding public key). If the request is to move crypto assets out of account 123, and the signature is signed by the customer's private key that put the crypto assets into account 123 the that would verify the request. If the request is verified then the request is a verified request, and the verified request may then be processed using the secure micro controller unit 2068.

The flow chart 400 continues at box 410 where the request is processed using the smart contract that is programmed on the secure micro controller unit 2068.

The processing of the cryptographic request may use the private cryptographic security key (for example a private key of an audit server for a multi-signature blockchain address). The cryptographic security key may be stored in secured memory 214 or accessed when needed via the auxiliary data connector 204.

The verified request processing may be a transfer involving crypto asset and on-blockchain address and an off blockchain accounts. The verified request processing may be to transfer crypto assets between an on-blockchain address and an off-blockchain account. The verified request processing may include to transfer the crypto asset from one off-blockchain account to a second off-blockchain account.

The processing of the verified request may include the on-chain ownership being transferred from an on-blockchain customer address to a blockchain address of an off-chain system. The off-chain system may track the crypto asset in an off-chain account and allows the crypto assets to be moved with requests signed by the private key associated with the customer wallet blockchain address.

The processing of the verified cryptographic request may include using a private cryptographic security key, for example a private key for a blockchain address, where the blockchain address may be a multi-signature address. The processing of the verified cryptographic request may include an open transactions protocol transaction. The processing of the verified cryptographic request may move crypto assets between an on-blockchain address and an off-blockchain account. The processing of the verified cryptographic request may move crypto assets out of an off-blockchain account, for example out of the off-blockchain account A to the off-blockchain account B.

The flow chart 400 ends after box 410.

The subject matter described above is provided by way of illustration only and should not be construed as limiting. Various modifications and changes can be made to the subject matter described without following the example embodiments and applications illustrated and described and without departing from the spirit and scope of the present invention, which was set forth above.

What is claimed is:

1. A crypto expansion card comprising: a computer interface configured to couple the crypto expansion card to a computing device; and a secure computing enclave coupled to the computer interface, where the secure computing enclave includes a secured micro controller unit configured to run off-blockchain smart contracts by: receiving an off-blockchain cryptographic request via the computer interface, verifying the off-blockchain cryptographic request is signed by a specific cryptographic key, and processing the verified off-blockchain cryptographic request on the secured micro controller unit, where the processing of the verified off-blockchain cryptographic request includes using a private cryptographic security key to generate a cryptographic signature, and where the processing of the verified off-blockchain cryptographic request includes an on-blockchain transaction with a multi signature address.

2. A crypto expansion card comprising: a computer interface configured to couple the crypto expansion card to a computing device; and a secure computing enclave coupled to the computer interface, where the secure computing enclave includes a secured micro controller unit configured to run off-blockchain smart contracts by: receiving an off-blockchain cryptographic request via the computer interface, verifying the off-blockchain cryptographic request is signed by a specific cryptographic key, and processing the verified off-blockchain cryptographic request on the secured micro controller unit, where the off-blockchain cryptographic request is to transfer a crypto asset, and where the off-blockchain cryptographic request to transfer the crypto asset involves an on-blockchain address.

3. The crypto expansion card of claim 2 where the cryptographic request is to transfer crypto assets between an on-blockchain address and an off-blockchain account.

4. The crypto expansion card of claim 2 where the cryptographic request to transfer the crypto asset involves an off-blockchain account.

5. He crypto expansion card of claim 2 where the cryptographic request to transfer the crypto asset includes an open transactions protocol transaction.

6. A crypto expansion card comprising: a computer interface configured to couple the crypto expansion card to a computing device; a memory that stores a private cryptographic security key; and an unalterable micro controller unit configured to run off-blockchain smart contracts by: receiving an off-blockchain cryptographic request via the computer interface, verifying the off-blockchain cryptographic request is authenticated by a cryptographic proof, and processing the verified off-blockchain cryptographic request using the private cryptographic security key stored in the memory, where the processing of the verified off-blockchain cryptographic request includes generating a cryptographic signature with the private cryptographic security key, and where the processing of the verified off-blockchain cryptographic request includes an on-blockchain address.

7. A crypto expansion card comprising: a computer interface configured to couple the crypto expansion card to a computing device; a memory that stores a private cryptographic security key; and an unalterable micro controller unit configured to run off-blockchain smart contracts by: receiving an off-blockchain cryptographic request via the computer interface, verifying the off-blockchain cryptographic request is authenticated by a cryptographic proof, and processing the verified off-blockchain cryptographic request using the private cryptographic security key stored in the memory, where the processing of the verified off-blockchain cryptographic request includes an open transactions protocol transaction.

8. A crypto expansion card comprising: a computer interface configured to couple the crypto expansion card to a computing device; a memory that stores a private cryptographic security key; and an unalterable micro controller unit configured to run off-blockchain smart contracts by: receiving an off-blockchain cryptographic request via the computer interface, verifying the off-blockchain cryptographic request is authenticated by a cryptographic proof, and processing the verified off-blockchain cryptographic request using the private cryptographic security key stored in the memory, where the memory and the unalterable micro controller unit are on a single integrated circuit.

9. A crypto expansion card comprising: a computer interface configured to couple the crypto expansion card to a computing device; a memory that stores a private cryptographic security key; and an unalterable micro controller unit configured to run off-blockchain smart contracts by: receiving an off-blockchain cryptographic request via the computer interface, verifying the off-blockchain cryptographic request is authenticated by a cryptographic proof, and processing the verified off-blockchain cryptographic request using the private cryptographic security key stored in the memory, where the processing of the verified off-blockchain cryptographic request moves crypto assets between an on-blockchain address and an off-blockchain account.

10. A crypto expansion card comprising: a computer interface configured to couple the crypto expansion card to a computing device; a memory that stores a private cryptographic security key; and an unalterable micro controller unit configured to run off-blockchain smart contracts by: receiving an off-blockchain cryptographic request via the computer interface, verifying the off-blockchain cryptographic request is authenticated by a cryptographic proof, and processing the verified off-blockchain cryptographic request using the private cryptographic security key stored in the memory, where the processing of the verified off-blockchain cryptographic request moves crypto assets out of an off-blockchain account.

11. A crypto expansion card comprising: a computer interface configured to couple the crypto expansion card to a computing device; a memory that stores a private cryptographic security key; and an unalterable micro controller unit configured to run off-blockchain smart contracts by: receiving an off-blockchain cryptographic request via the computer interface, verifying the off-blockchain cryptographic request is authenticated by a cryptographic proof, and processing the verified off-blockchain cryptographic request using the private cryptographic security key stored in the memory, where the cryptographic proof uses a multi-signature blockchain address signature.

* * * * *